United States Patent
Garg

(10) Patent No.: US 6,776,334 B1
(45) Date of Patent: Aug. 17, 2004

(54) SYSTEM AND METHOD FOR DETERMINING THE LOCATION OF A MOBILE DEVICE WITHIN A WIRELESS NETWORK

(75) Inventor: Atul Garg, Sunnyvale, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 563 days.

(21) Appl. No.: 09/792,140

(22) Filed: Feb. 22, 2001

(51) Int. Cl.[7] .......................... G06K 5/00; G07B 15/02
(52) U.S. Cl. ................................ 235/384; 235/382
(58) Field of Search .......................... 235/384, 382, 235/380, 492, 441, 382.5, 375, 383, 486, 487; 455/456.2, 412.1, 456.1, 456.5, 457, 466

(56) References Cited

U.S. PATENT DOCUMENTS

| | | | |
|---|---|---|---|
| 5,821,513 A | 10/1998 | O'Hagan et al. | 235/383 |
| 6,347,229 B1 * | 2/2002 | Zelmanovich et al. | 455/456.1 |
| 6,377,793 B1 * | 4/2002 | Jenkins | 455/412.1 |
| 6,385,458 B1 * | 5/2002 | Papadimitriou et al. | 455/456.2 |
| 2002/0102995 A1 * | 8/2002 | Zelmanovich et al. | 455/456 |
| 2002/0177435 A1 * | 11/2002 | Jenkins et al. | 455/412 |

* cited by examiner

Primary Examiner—Thien M. Le
(74) Attorney, Agent, or Firm—Renner, Otto, Boisselle, & Sklar, LLP

(57) ABSTRACT

A system for locating a mobile device within a wireless network includes detecting one of a plurality of infra red beacon signals, each from a location beacon. A memory stores a plurality of predetermined transmission frames, each corresponding to one of the plurality of beacon signals. A transmitter selects one of a plurality of predetermined transmission frames in accordance with the detected beacon signal and transmits the predetermined frame to a remote monitoring device across a network.

19 Claims, 3 Drawing Sheets

SYSTEM AND METHOD FOR DETERMINING THE LOCATION OF A MOBILE DEVICE WITHIN A WIRELESS NETWORK

TECHNICAL FIELD

The present invention relates generally to determining the location of a mobile device within a wireless network, and more particularly, to determining the location of a mobile device within a wireless network with a single access point and with adequate accuracy for a home environment.

BACKGROUND OF THE INVENTION

In recent years, businesses in most all industries have improved their productivity by linking their computer systems via a local area network and/or wide area network and installing software systems to track and manage the status of the business's operations, This has enabled businesses to automate many tasks that were traditionally performed using manual paper based systems. The network infrastructure employed in such systems typically includes a cabled backbone communicating data between various computing systems utilizing a protocol such as Ethernet. Additionally, wireless access points are coupled to the cabled backbone and are used to communicate data to portable computing systems which are within a zone, or cell, around the access point in which a portable computing system and the access point can effectively communicate data. The physical topology of the cabled backbone and placement of each wireless access point will typically provide for cell coverage throughout most geographic areas of the facility.

More recently, it has been desirable to provide systems for locating portable computing systems within the facility for purposes of tracking movement of goods and/or personnel throughout the facility. U.S. Pat. No. 5,519,760 to Borkowski et al. discloses a cellular position locating system which teaches a method for determining which, of a plurality of cells of a cellular telephone network, a mobile device is located within. More recently, U.S. Pat. No. 6,006,096 to Trompower discloses a system for measuring the strength of a transmitted signal from a mobile device at a plurality of wireless access points to calculate a more specific location of a mobile computing device.

In the consumer market, it has been contemplated to use the existing plain old telephone service (POTS) network in homes for communicating data between various computing devices. More specifically, the Home Phone line Network Association (HPNA), which is an industry consortium of companies including Advanced Micro Devices of Sunnyvale California, has proposed standards for communicating data on the POTS network. With the advent of HPNA systems it is possible for consumers to utilize the existing POTS infrastructure in their homes to network several computing devices in a similar manner to the way an Ethernet network infrastructure interconnects computers in a commercial facility, although at a slower data rate. It has also been envisioned to couple a wireless access point to the POTS network which would serve to couple data between devices on the POTS network and mobile computing devices utilized within the home. Because the range of wireless communications typically exceeds the physical size of most homes, only a single access point would be required to support wireless communications throughout the entire home. As such, home wireless access systems do not need to include multiple cell roaming and registration systems as are required by most commercial systems.

A problem associated with a single cell system is that the mobile device location systems taught in both Borkowski and Trompower would not work because both require use of more than one access point. Additionally such systems, and even more expensive systems such a global positioning systems (GPS), locate a device within a range that is too large compared to the size of a typical home to be useful. For example, if such a system were to locate a device within three meters of accuracy, that information could not be used effectively to determine which room or even on which floor a mobile computing device is located.

Therefore, what is needed is an inexpensive system for locating a mobile device within a home wireless networking environment and locating the device with an accuracy commensurate with the size of a typical home environment.

SUMMARY OF THE INVENTION

A first aspect of this invention is to provide a system for locating a mobile device within a wireless network environment. The system comprises an access point for wirelessly receiving a data frame from the mobile device and forwarding the data frame to a location monitoring appliance on a wired network backbone. A plurality of location beacons each transmit a unique beacon signal, which may be modulated illumination, which represents the location of the beacon. The mobile device includes a beacon detection circuit for detecting the modulated illumination beacon signal, a frame selection circuit for selecting one of a plurality of predetermined data frames for transmission in response to the beacon signal, and a transmission circuit for transmitting the selected data frame to the location monitoring appliance. The location monitoring appliance provides data to an operator which is representative of the mobile device and the beacon signal received by the mobile device.

Each of the predetermined data frames represents a predetermined message and is compliant with the network protocol. The frame selection circuit receives the signal from the beacon detection circuit and selects the predetermined data frame which includes the predetermined message associated therewith. Each data frame may includes a series of transmission signal values which represent a network address of the location monitoring appliance (e.g. destination address), a network address of the mobile device (e.g. source address), a network protocol compliant preamble, and the predetermined message. In the exemplary embodiment, the series of transmission signal values represent a baseband transmission signal and the transmitter includes a D/A converter for generating an analog baseband signal and an analog mixer for generating the modulated carrier.

The location monitoring appliance may activate at least one of an audio and visual alarm based on the network address of the mobile device and the predetermined message matching an alarm condition. The alarm may be activated on a computing device by sending a signal to the mobile computing device via the wireless network.

A second aspect of the present invention is to provide a network device for reporting its location within a wireless network to a remote computing device. The network device comprises: a) a location detection circuit for receiving a modulated illumination beacon signal from one of a plurality of location beacons, each of which transmits a unique modulated illumination beacon signal; b) a memory storing a plurality of sets of transmission signal values representing a transmission frame of a predetermined message complying with a predetermined network protocol, each set of transmission signal values being associated with one of the plurality of beacon signals; c) a transmission selection circuit for selecting the set of transmission signal values associated with the received beacon signal; and d) a transmitter coupled to the memory generating a modulated carrier signal representing the selected set of transmission signal values.

The transmission signal values may represent a network address of the remote computing device, a network address of the network device, a network protocol compliant preamble, and message data. Preferably, the transmission signal values represent a baseband transmission signal and the transmitter includes a D/A converter for generating an analog baseband signal and an analog mixer for generating the modulated carrier.

The remote computing device may activate at least one of an audio and visual alarm based on the network address of the network device and the predetermined message matching an alarm condition. The alarm may be activated on a computing device by sending a signal to the mobile computing device via the wireless network.

A third aspect of the present invention is to provide a method of reporting a location of a network device to a remote computing device. The method comprises: a) receiving a modulated illumination beacon signal from one of a plurality of location beacons; b) selecting a transmission frame corresponding to the received beacon signal from a plurality of transmission frames pre-stored in a memory; and c) transmitting the selected transmission frame to the remote computing device.

The pre-stored transmission frame may include a sequence of transmission signal values representing a network address of the remote computing device, a network address of the network device, a network protocol compliant preamble, and message data. The transmission signal values may represent a baseband transmission signal and the step of transmitting the selected transmission frame may include converting the signal values to an analog baseband signal and mixing the analog baseband signal up to carrier frequency.

The method may further include generating at least one of an audio and visual alarm based on the network address of the network device and the predetermined message matching an alarm condition. The alarm may be activated on a mobile computing device by sending a signal to the mobile computing device via the wireless network.

DESCRIPTION OF THE PREFERRED EMBODIMENTS

Figure 1:
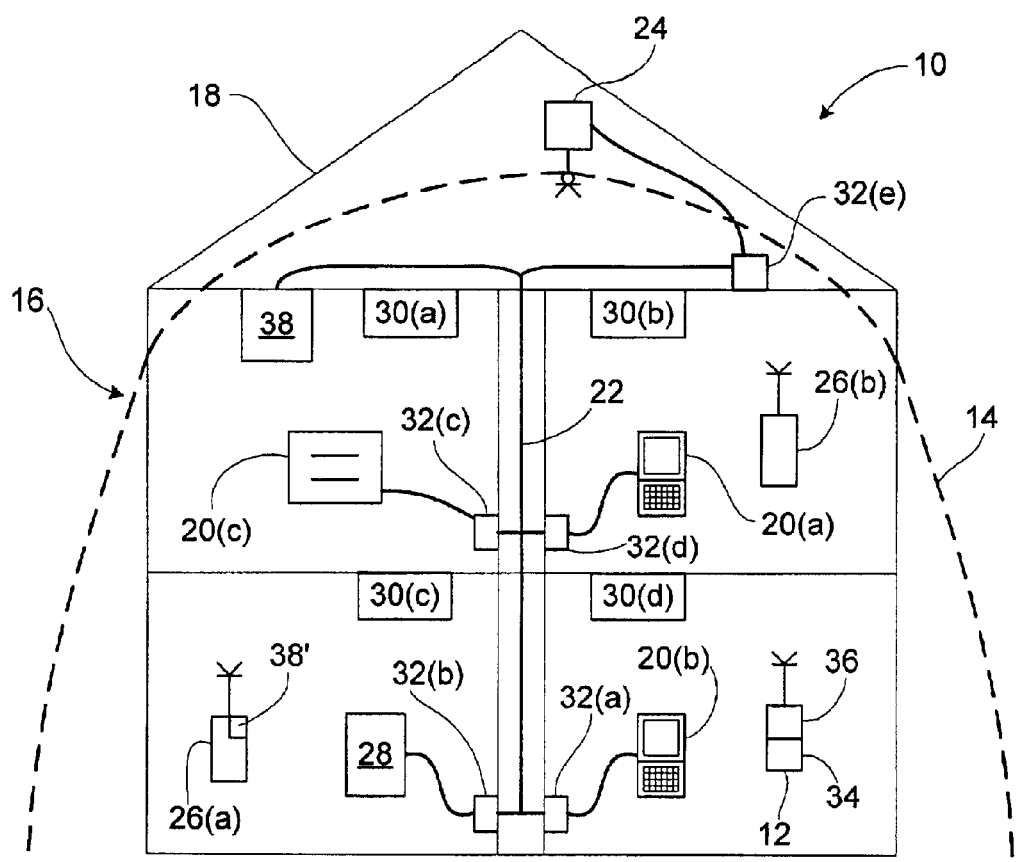
FIG. 1 is block diagram of a system for determining the location of a mobile location unit in accordance with one embodiment of this invention.

The present invention will now be described in detail with reference to the drawings. In the drawings, like reference numerals are used to refer to like elements throughout.

Referring to FIG. 1, a system 10 for determining the location of a mobile location unit 12 within a zone of coverage 14 of a wireless network 16 is shown. In an exemplary embodiment, the wireless network 16 is implemented within a typical home 18 and includes a wireless network access point 24 for wirelessly communicating data with a plurality of mobile devices 26(a) and 26(b) located within the zone of coverage 14. The zone of coverage 14 includes the region around the wireless network access point 24 in which mobile devices 26(a) and 26(b) may maintain RF communications with the wireless network access point 24. The size and shape of the zone of coverage 14 is dependent on the transmission power of both the wireless network access point 24 and the mobile devices 26(a) and 26(b), environmental noise, the capability of the receiver circuits within each of the wireless network access point 24 and the mobile devices 26(a) and 26(b) to extract, detect, and error correct a signal within the environmental noise, and objects obstructing and reflecting RF signals. In the exemplary embodiment, the transmission power and the receiver circuits are selected such that a single wireless network access point 24 will provide a zone of coverage 14 which encompasses an entire home of typical size.

The wireless network 16 includes a wired backbone 22. Coupled to the wired backbone 22 are a plurality of fixed node computing devices 20(a)–20(c), the wireless network access point 24, and a location monitoring appliance 28. Each of the computing devices 20(a)–20(c) may be a standard desktop computer, a networked peripheral such as a printer, a networked consumer appliance, or any other device to which a network connection is useful.

In the exemplary embodiment, the wired backbone 22 comprises the plain old telephone service (POTS) network which exists in the typical home 18. The POTS network wired backbone 22 includes a multi-drop twisted pair topology, typically within the walls of the home 18, interconnecting a plurality of RJ-11 jacks 32(a)–32(e) located within various rooms. The POTS network wired backbone 22 is coupled to the public switched telephone network (PSTN) for providing telephone service to typical POTS telephone(s) (not shown) which may be coupled to one or more of the RJ-11 jacks 32(a)–32(e).

Each of the wireless network access point 24, the computing devices 20(a)–20(c), and the location monitoring appliance 28 are coupled to the wired backbone 22 via one of the RJ-11 jacks. Data is communicated between each of such devices utilizing one of the HPNA 1.0 protocol, the HPNA 2.0 protocol, or other MAC and PHY layer protocols useful for communicating data over a network comprising POTS topology. Each of the HPNA protocols have been developed by the Home Phoneline Networking Association (HPNA) which an industry consortium including Advanced Micro Devices of Sunnyvale Calif.

In operation, each of the mobile devices 26(a)–26(b) may communicate with each of the computing devices 20(a)–20(c) on the wired backbone 22 utilizing the wireless network access point 24. More specifically, when sending data from one of the mobile device 26(a)–26(b) to one of the computing devices 20(a)–20(c), a frame of data is transmitted via an RF signal from the mobile device 26(a) or 26(b) to the wireless network access point 24 and the wireless network access point 24, in turn, sends the frame of data to the one of the computing devices 20(a)–20(c) to which the frame is addressed. Similarly, when sending data from one of the computing devices 20(a)–20(c) to one of the mobile devices 26(a)–26(b), a frame of data is first sent from the computing device 20 to the wireless network access point 24 and the wireless network access point 24, in turn, transmits the frame via an RF signal and the one of the mobile devices 26(a)–26(b) to which the frame is addressed receives the frame.

Within each room of the home 18 is positioned an infrared beacon 30(a)–30(d) which generates a modulated infrared light signal which has a signature pattern which is unique from the signature pattern of all other infrared beacons 30(a)–30(d) positioned within the home 18. Because infrared RF illumination is blocked by typical walls, the region around each infrared beacon 30 in which the signature pattern is detectable is typically limited to the room in which the infrared beacon 30 is located.

Each mobile location unit 12 includes an infrared receiver 34 and an RF transmitter 36. The infrared receiver 34 operates to detect the signature pattern of the infrared beacon 30 to which the mobile location unit 12 is most closely positioned and the RF transmitter 36 operates to transmit a frame of data identifying the detected signature pattern to the wireless network access point 24, which in turn forwards the data to the location monitoring appliance 28. A more detailed description of the mobile location unit 12 is included below.

The location monitoring appliance 28 includes a combination of hardware and software for mapping the signature pattern detected by the infrared receiver circuit to the corresponding location of the beacon within the home. Based on such mapping, the location monitoring appliance is capable of displaying the location of the beacon 30 on a display screen such that a human operator can determine the general location of the mobile location unit 12 by viewing the location of the beacon to which the mobile locating unit is most closely related.

In addition, the location monitoring appliance 28 may include appropriate hardware and software for comparing the identity of the mobile location unit 12 and the detected signature pattern to a table of preset alarms. If the particular mobile unit 12 is located in a particular predetermined location the monitoring appliance 28 may activate an alarm device 38 to notify people of the alarm condition.

Further yet, the location monitoring appliance 28 may include appropriate software for comparing the direction of motion of a mobile location unit 12 based on a history of detected signature patterns over a brief time interval. As such, the location monitoring appliance 28 may also activate an alarm device 38 based on the identity of a particular mobile unit 12 and its direction of motion matching an alarm condition.

In the exemplary embodiment, the alarm device 38 includes an audio and/or visual alarm and the device 38 may be positioned within one of the rooms wherein the audio alarm is audible throughout the home 18. The alarm device 38 may be coupled to the monitoring appliance 28 utilizing the wired network backbone 22 and activated utilizing HPNA data frames transmitted over such wired network backbone 22. Alternatively, the alarm device 38 may be directly coupled to the monitoring appliance 28 utilizing appropriate hardware and software interface drivers.

In an alternative embodiment, the alarm device 38' may be a hardware and/or software circuit operating on one of the mobile devices 26(a) or 26(b) which, when activated, generates and audio and/or visual signal to notify the operator of the mobile device 26(a) or 26(b) of the alarm condition.

It should be appreciated that the monitoring and alarm functions discussed above may be useful in a home environment for monitoring the location of a young child who has a location monitoring device 12 secured to his or her wrist. It is envisioned that such systems would activate the alarm device 38 if the child were to approach restricted or dangerous areas of the home 18 (e.g. kitchen, whirlpool room, ect).

Figure 2:
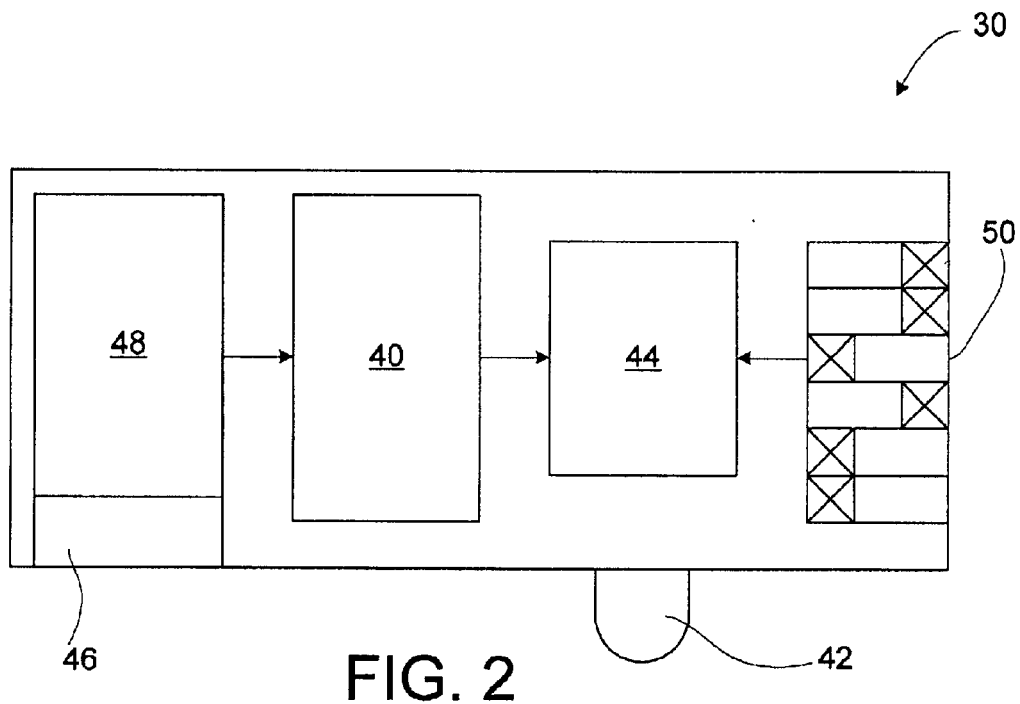
FIG. 2 is a block diagram of a location beacon in accordance with one embodiments of this invention.

Turning to FIG. 2, a block diagram of an exemplary infrared beacon 30 is shown. The beacon 30 includes a power source 40 such as a battery, an infrared light source 42, and a modulation circuit 44 which modulates the infrared light source 42 with a signature pattern which is unique from the signature pattern of all other infrared beacons positioned within the home 18. In addition, the beacon 30 may include a photocell 46 and a battery charging circuit 48 for maintaining a battery charge utilizing photo energy from ambient illumination.

In the exemplary embodiment, the beacon includes a block of DIP switches 50 for setting a binary signature pattern. A typical 6 DIP switch block 50 will enable the beacon to be set to one of 64 unique signature patterns. Alternatively, the infrared beacon 30 may be coupled to the network via a hardwired network connection or by a wireless receiver such that the signature pattern may be set by a remote computing device.

In operation, the modulation circuit 44 continually and repetitively modulates power to the light source 42 for generating the unique signature pattern.

Figure 3:
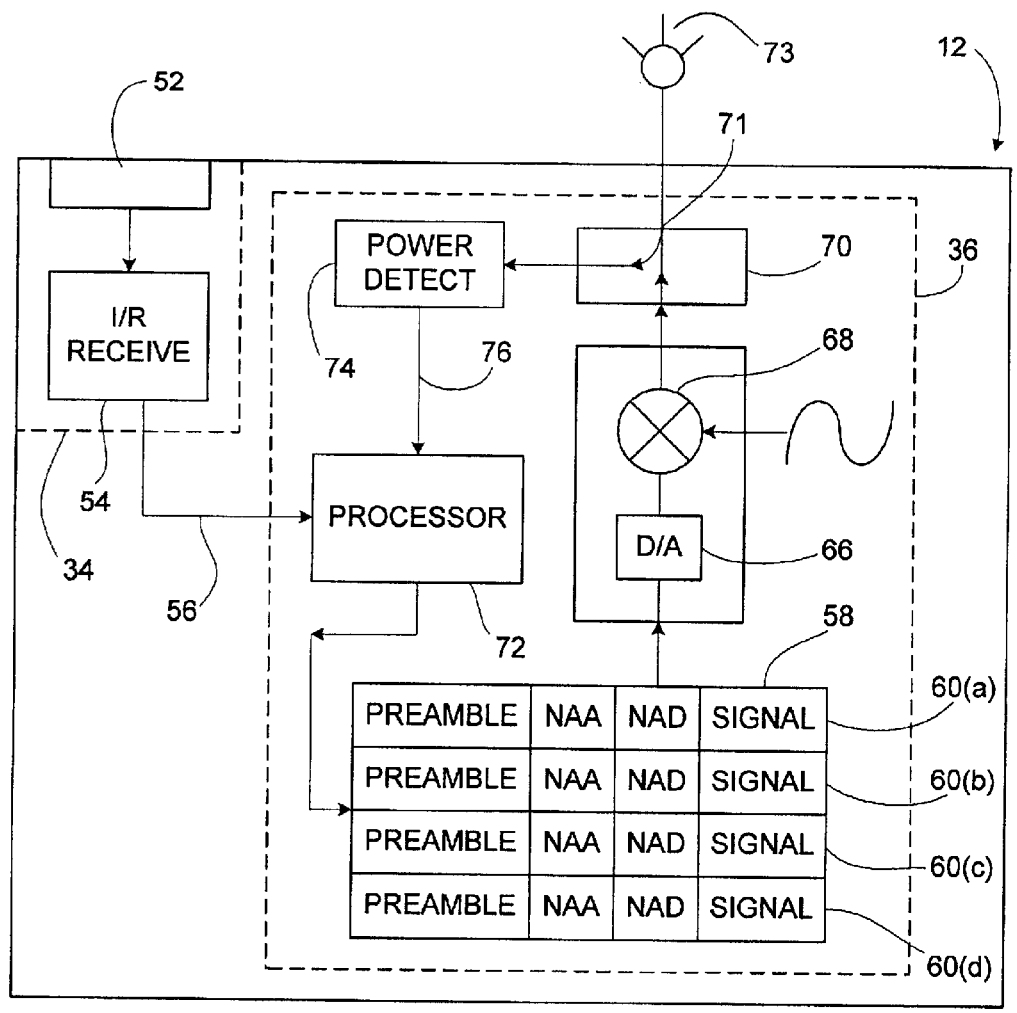
FIG. 3 is a block diagram of a mobile location unit in accordance with one embodiment of this invention.

Referring to FIG. 3, a block diagram of an exemplary mobile location unit 12 is shown. The mobile location unit 12 includes the infrared detection circuit 34 which comprises a photocell 52 for generating a voltage signal corresponding to detected infrared illumination which, when the detected infrared illumination is generated by a beacon, will be modulated in accordance with the signature pattern. The voltage signal is coupled to an infrared receiver circuit 54 which includes appropriate filters for extracting the signature pattern from ambient noise and appropriate latching circuit logic for generating a digital signal corresponding to the signature pattern on line 56.

Line 56 couples the digital signal to the transmitter circuit 36. The transmitter circuit 36 includes a memory 58, which may be a random access memory or a non-volatile memory. Stored in the memory 58 are digital data values representing each of a plurality of predetermined transmission frames 60(a)–60(d). Each predetermined transmission frame 60 corresponds to a respective one of the possible beacon signature patterns.

Figure 4:
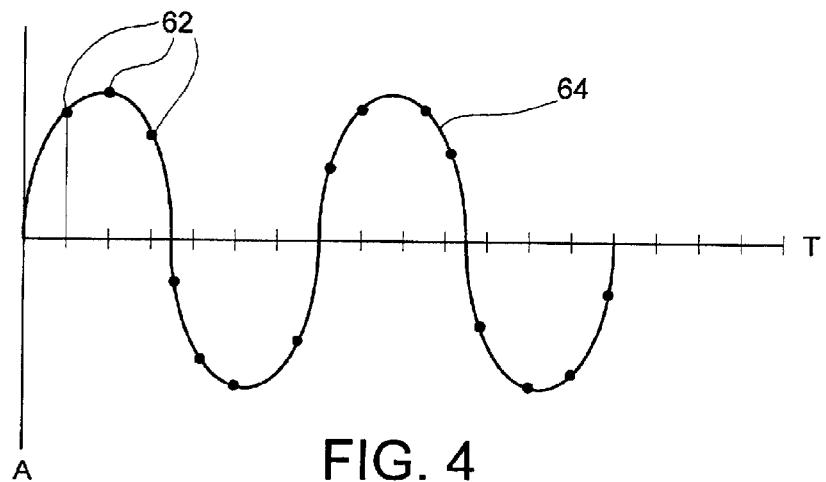
FIG. 4 is a time domain diagram of a modulated carrier signal in accordance with one embodiment of this invention.

Referring briefly to the time domain diagram of FIG. 4 in conjunction with the block diagram of FIG. 3, each predetermined transmission frame 60 is stored in the memory 58 as a sequence of values 62 representing a predetermined baseband signal 64 for the entire frame, including the mobile locating device 12 network address (frame source address), the network address of the location monitoring appliance 28 (FIG. 1) (frame destination address), a preamble compliant with the RF transmission protocols, and predetermined data values identifying the detected signature pattern.

When the sequence of values 62 is clocked out of the memory 58, a D/A converter 66 generates an analog baseband signal in response to the sequence of values 62. An analog mixer circuit 68, which includes appropriate signal generators and filters, mixes the analog baseband signal up to carrier frequency. The modulated carrier is then appropriately amplified in an analog front end 70 for RF transmission to the wireless network access point 24 (FIG. 1).

A processor circuit 72 is coupled to line 56 and receives the digital signal. The processor circuit 72 also receives a signal on line 76 from a power detection circuit 74 which represents whether the channel is clear for transmission. The power detection circuit 74 is coupled to an antenna 73 through a directional coupler 71 within the analog front end 70 such that the power detection circuit 74 may detect electromagnetic energy present within the transmission frequency band.

In response to the digital signal on line 56 and upon detecting a clear channel based on the signal on line 76, the processor circuit selects the appropriate one of the predetermined transmission frames 60 from the memory 58 for transmitting as an RF signal. The processor circuit 72 may be a processor executing code, alternatively, the processor circuit 72 may simply be latching logic necessary for clocking the appropriate one of the predetermined transmission frames 60 our of the memory 58 in response to the digital signal on line 56 and an indication of a clear channel on line 76.

Figure 5:
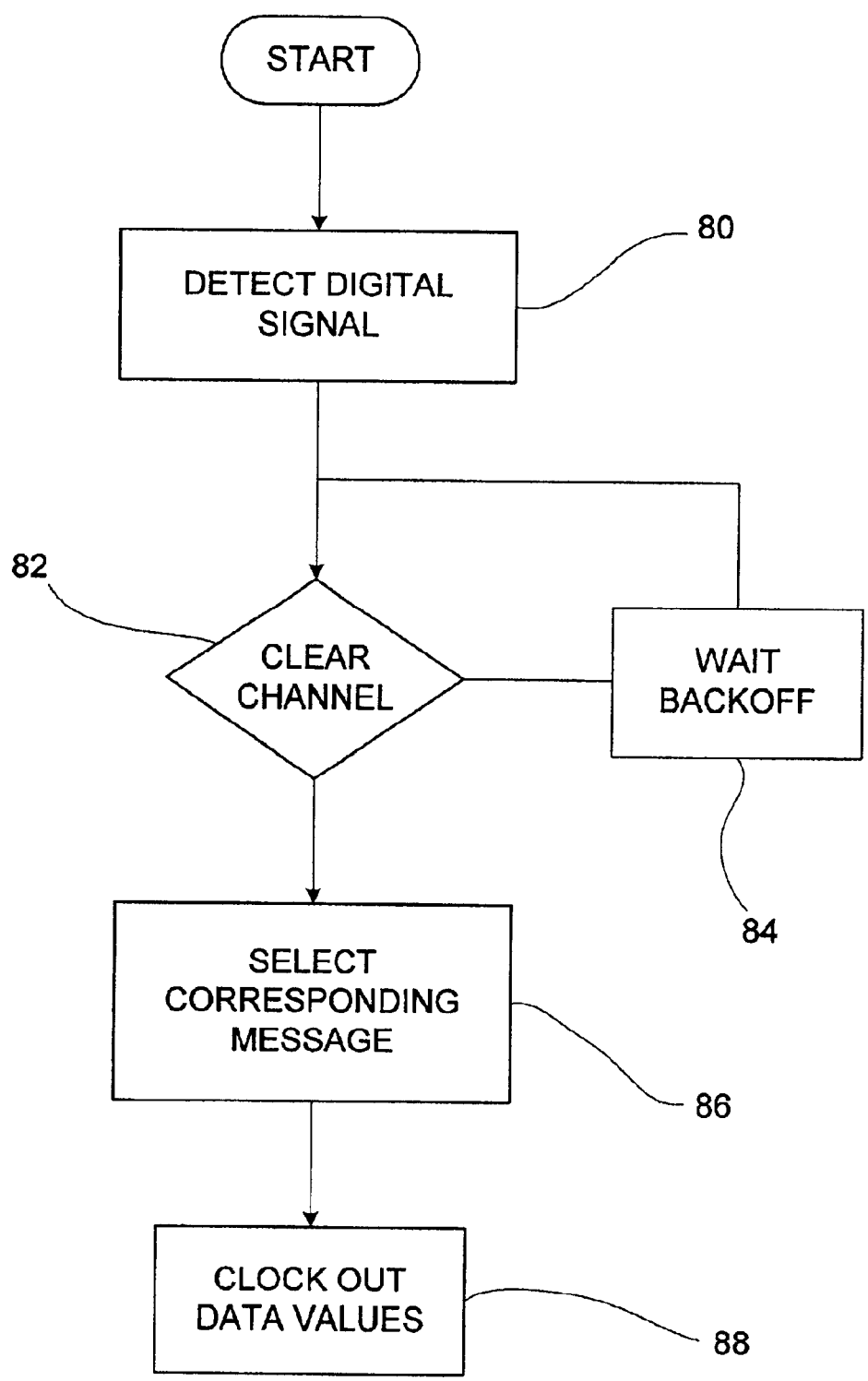
FIG. 5 is a flowchart showing exemplary operation of a mobile location unit in accordance with one embodiment of this invention.

Referring to the flowchart of FIG. 5 in conjunction with the block diagram of FIG. 3, operation of the processor circuit 72 is shown. Step 80 represents detecting a digital signal representing a signature pattern on line 56. Thereafter, step 82 represents detecting whether the channel is clear based on the signal on line 76, If the channel is not clear, step 84 represents waiting an appropriate back-off duration of time before again returning to step 82 to detect whether the channel is clear.

When the channel is clear at step 82, step 86 represents selecting the corresponding one of the predetermined transmission frames 60 based on the signature pattern represented by the signal on line 56 and step 88 represents clocking the values corresponding to the selected predetermined transmission frame 60 to the D/A converter 66.

It should be appreciated that the system for locating a device within a wireless network of this invention provides for a cost effective system for locating a device with an accuracy that would be required within a typical home environment. Further, the system of this invention provides for locating a device within a wireless network which comprises only a signal RF access point. Although the invention has been shown and described with respect to certain preferred embodiments, it is obvious that equivalents and modifications will occur to others skilled in the art upon the reading and understanding of the specification. For example, the exemplary embodiment of the location unit provides for transmission of a frame pre-stored in memory while a modification may include selection of network addresses and a pre-amble stored in memory and repeating the detected signature pattern for the portion of the frame representing data. The present invention includes all such equivalents and modifications, and is limited only by the following claims.

What is claimed is:

1. A system for locating a mobile device within a wireless network environment, the system comprising:
   a) an access point for wirelessly receiving a data frame from the mobile device and forwarding the data frame to a location monitoring appliance on a wired network backbone;
   b) a plurality of location beacons, each transmitting a unique beacon signal representing the location of the beacon; and
   c) wherein the mobile device includes a beacon detection circuit for receipt of the beacon signal, a frame selection circuit for selecting one of a plurality of predetermined data frames as representative of the location of the mobile device for transmission in response to the beacon signal, and a transmission circuit for transmitting the selected data frame and wherein the location monitoring appliance provides data representative of the mobile device and the beacon signal received by the mobile device.

2. The system for locating a mobile device within a wireless network environment of claim 1, wherein the each of the plurality of location beacons transmits the beacon signal utilizing modulated illumination and the beacon detection circuit detects the modulated illumination and provides a signal representative thereof.

3. The system for locating a mobile device within a wireless network environment of claim 2, wherein the mobile device includes a memory storing, for each of the predetermined data frames, a set of signal values representing transmission of the predetermined message compliant with the network protocol and wherein the frame selection circuit receives the signal from the beacon detection circuit and selects the predetermined message associated therewith.

4. The system for locating a mobile device within a wireless network environment of claim 3, wherein the transmission signal values represent a network address of the location monitoring appliance, a network address of the mobile device, a network protocol compliant preamble and the predetermined message.

5. The system for locating a mobile device within a wireless network environment of claim 4, wherein the transmission signal values represent a baseband transmission and the transmitter includes a D/A converter generating an analog baseband signal and an analog mixer for generating the modulated carrier.

6. The system for locating a mobile device within a wireless network environment of claim 5, wherein the location monitoring appliance activates at least one of an audio and visual alarm based on the network address of the mobile device and the predetermined message matching an alarm condition.

7. The system for locating a mobile device within a wireless network environment of claim 5, wherein the at least one of an audio and visual alarm is activated on a mobile computing device and the location monitoring appliance activates the alarm by sending a signal to the mobile computing device via the wireless network.

8. A network device for reporting its location within a wireless network to a remote computing device, the network device comprising:
   a) a location detection circuit for receiving a beacon signal from one of a plurality of location beacons;
   b) a memory storing a plurality of sets of transmission signal values representing a transmission frame of a predetermined message complying with a predetermined network protocol, each set of transmission signal values associated with one of the plurality of beacon signals;
   c) a transmission selection circuit for selecting the set of transmission signal values associated with the received beacon signal as representative of the location of the mobile device; and
   d) a transmitter coupled to the memory generating a modulated carrier signal representing the selected set of transmission signal values.

9. The network device of claim 8, wherein each of the plurality of location beacons transmits the beacon signal utilizing modulated illumination and the beacon detection circuit detects the modulated illumination.

10. The network device of claim 9, wherein the transmission signal values represents a network address of the remote computing device, a network address of the network device, a network protocol compliant preamble, and message data.

11. The network device of claim 10, wherein the transmission signal values represent a baseband transmission and the transmitter includes a D/A converter generating an analog baseband signal and an analog mixer for generating the modulated carrier.

12. The network device of claim 11, wherein the remote computing device activates at least one of an audio and visual alarm based on the network address of the network device and the predetermined message matching an alarm condition.

13. The network device of claim 12, wherein the at least one of an audio and visual alarm is activated on a mobile computing device and the remote computing device activates the alarm by sending a signal to the mobile computing device via the wireless network.

14. A method of reporting a location of a network device to a remote computing device, the method comprising:
   a) receiving a beacon signal from one of a plurality of location beacons;
   b) selecting a transmission frame corresponding to the received beacon signal from a plurality of transmission frames pre-stored in a memory as representative of the location of the mobile device; and
   c) transmitting the selected transmission frame to the remote computing device.

15. The method of claim 14, wherein the beacon signal comprises modulated illumination.

16. The method of claim 15, the prestored transmission frame includes a sequence of transmission signal values representing a network address of the remote computing device, a network address of the network device, a network protocol compliant preamble, and message data.

17. The method of claim 16, wherein the transmission signal values represent a baseband transmission signal and the step of transmitting the selected transmission frame includes converting the signal values to an analog baseband signal and mixing the analog baseband signal up to carrier frequency.

18. The method of claim 17, further including a step of generating at least one of an audio and visual alarm based on the network address of the network device and the predetermined message matching an alarm condition.

19. The method of claim 18, wherein the step of generating at least one of an audio and a visual alarm includes activating an alarm on a mobile computing device by sending a signal to the mobile computing device via the wireless network.

* * * * *